(12) United States Patent
Goto

(10) Patent No.: US 11,816,473 B2
(45) Date of Patent: Nov. 14, 2023

(54) UPDATING METHOD FOR IN-VEHICLE SOFTWARE AND IN-VEHICLE SYSTEM

(71) Applicant: YAZAKI CORPORATION, Tokyo (JP)

(72) Inventor: Jun Goto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 115 days.

(21) Appl. No.: 17/714,124

(22) Filed: Apr. 5, 2022

(65) Prior Publication Data

US 2022/0326936 A1    Oct. 13, 2022

(30) Foreign Application Priority Data

Apr. 7, 2021    (JP) .................. 2021-065457

(51) Int. Cl.
*G06F 8/65*    (2018.01)
(52) U.S. Cl.
CPC ..................... *G06F 8/65* (2013.01)
(58) Field of Classification Search
None
See application file for complete search history.

(56) References Cited

U.S. PATENT DOCUMENTS

| | | |
|---|---|---|
| 2006/0259207 A1 | 11/2006 | Natsume |
| 2010/0313192 A1 | 12/2010 | Natsume |
| 2014/0068590 A1 | 3/2014 | Natsume |
| 2017/0024201 A1* | 1/2017 | Diedrich .................. G06F 8/65 |
| 2017/0075678 A1 | 3/2017 | Kurosawa et al. |
| 2019/0193653 A1* | 6/2019 | Nakamura ............ G06F 9/4893 |
| 2019/0354364 A1 | 11/2019 | Seki |
| 2020/0394033 A1* | 12/2020 | Hayashidera ......... B60R 16/023 |

FOREIGN PATENT DOCUMENTS

| | | |
|---|---|---|
| JP | 2006-301960 A | 11/2006 |
| JP | 2019-73106 A | 5/2019 |

* cited by examiner

*Primary Examiner* — Qing Chen
(74) *Attorney, Agent, or Firm* — KENEALY VAIDYA LLP

(57) ABSTRACT

There are provided an updating method for in-vehicle software and an in-vehicle system for updating a software, the updating method including: securing one area in a memory on a zone control unit included in the in-vehicle system, the one area being capable of storing one update data for updating the zone control unit and lower control units which are an update object; repeatedly checking whether the update data exists in a predetermined software supply source; downloading the update data from the software supply source to store the update data in the one area, when the update data satisfying one download condition exists in the software supply source; and preferentially selecting the one update data with the highest priority from a plurality of update data to execute the downloading, when the plurality of update data satisfying the one download condition exist concurrently in the software supply source.

9 Claims, 5 Drawing Sheets

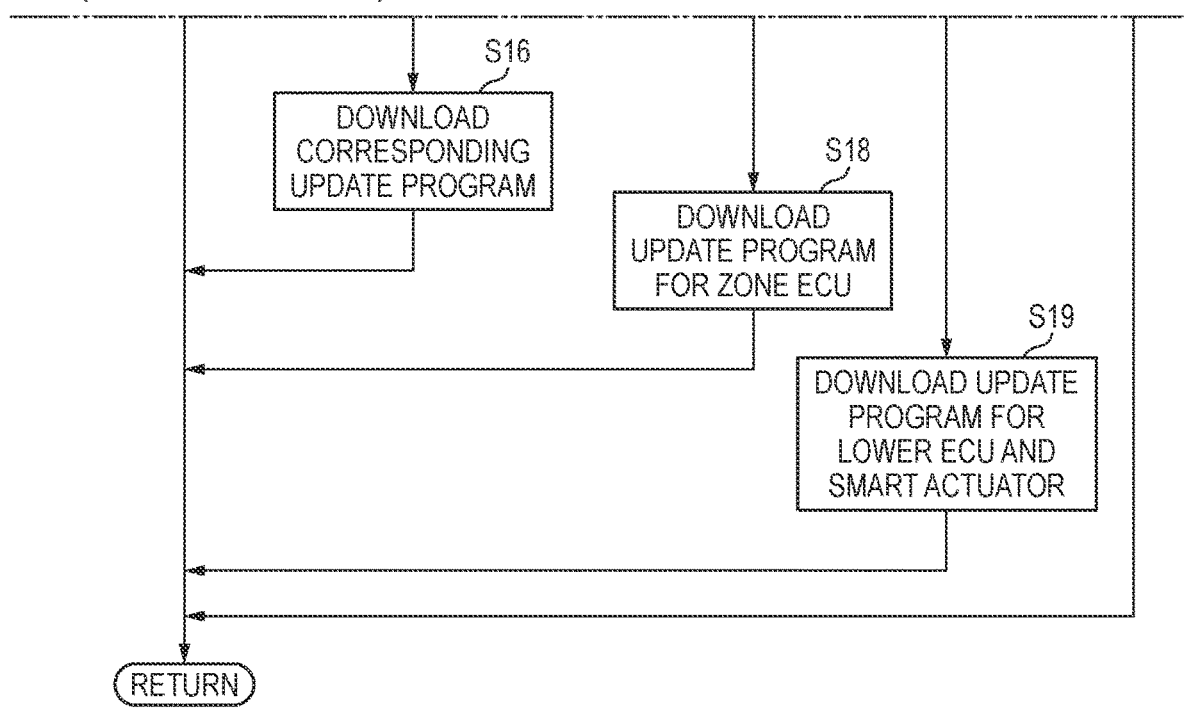

UPDATING METHOD FOR IN-VEHICLE SOFTWARE AND IN-VEHICLE SYSTEM

CROSS-REFERENCE TO RELATED APPLICATIONS

This application is based on and claims priority under 35 USC 119 from Japanese Patent Application No. 2021-065457 filed on Apr. 7, 2021, the contents of which are incorporated herein by reference.

TECHNICAL FIELD

The present disclosure relates to an updating method for in-vehicle software and an in-vehicle system.

BACKGROUND ART

In recent years, vehicles attempt to adopt the Over The Air (OTA) software update system that updates software of an in-vehicle system using wireless communication.

For example, an in-vehicle system of JP2019-073106A can connect to a cloud by wireless communication and acquire programs and data. JP2019-073106A also shows that a memory of a rewritable node of the in-vehicle system includes a storage area for control, a first storage-only area, a second storage-only area, and the like.

JP2006-301960A discloses that a main storage area for storing current version programs and a sub storage area for storing updated version programs are formed.

However, in recent years, in-vehicle systems are equipped with a large number of electronic control units (ECUs), and each ECU includes a built-in independent computer for control. Therefore, for example, when updating software to add new functions to the in-vehicle system or to improve overall performance of the in-vehicle system, it is necessary to update the software used by each computer of the large number of ECUs.

Therefore, an amount of software data that needs to be updated is enormous, and it is predicted that an update process will take an enormous amount of time. In the in-vehicle system of JP2019-073106A, a storage area must be secured in the memory for storing programs and data for update in each rewritable node.

That is, in order to enable software update, a dedicated storage area having a large capacity must be provided for each ECU. The entire system requires an enormous amount of storage capacity.

However, the storage area provided for the purpose of storing update software is not used except when the update process is performed. Therefore, securing the storage area having a large capacity for the software update leads to a decrease in memory utilization efficiency of the entire system, which is a factor of cost increase.

Unusual situations such as the software update never completes may occur. For example, when a power supply voltage of an in-vehicle battery or the like drops before one software update process is completed, or when the update is no longer allowed, the update must be interrupted. The update may not be completed due to a defect in the software itself. Then, when the software update cannot be completed due to interruption or the like, the same update process must be executed from beginning when a next update becomes possible.

SUMMARY OF INVENTION

The present disclosure provides an updating method for in-vehicle software capable of reducing capacity of a storage area required for software update, and an in-vehicle system.

According to an illustrative aspect of the present disclosure, an updating method for in-vehicle software for updating a software included in an in-vehicle system having an uppermost control unit, a zone control unit connected to a downstream side of the uppermost control unit, and a plurality of lower control units connected to a downstream side of the zone control unit, includes: securing one area in a memory on the zone control unit, the one area being capable of storing one update data for updating the zone control unit and the lower control units which are an update object; repeatedly checking whether the update data exists in a predetermined software supply source; downloading the update data from the software supply source to store the update data in the one area, when the update data satisfying one download condition exists in the software supply source; and preferentially selecting the one update data with the highest priority from a plurality of update data to execute the downloading, when the plurality of update data satisfying the one download condition exist concurrently in the software supply source.

According to another illustrative aspect of the present disclosure, an in-vehicle system, includes: an uppermost control unit; a zone control unit connected to a downstream side of the uppermost control unit: and a plurality of lower control units connected to a downstream side of the zone control unit. The zone control unit includes; a memory; and a processor, the memory includes one area capable of storing one update data for updating either one software of the zone control unit or the plurality of lower control units. The processor is configured to: select an update object of the update data stored in the one area, and check whether the update data exists in a predetermined software supply source and to check a type of the update object. The processor executes an update process to: download the update data from the software supply source to store the update data in the one area, when the update data satisfying one download condition exists in the software supply source; and preferentially select the one update data with the highest priority from a plurality of update data to execute the downloading, when the plurality of update data satisfying the one download condition exist concurrently in the software supply source.

The present disclosure has been briefly described as above. Further, details of the present disclosure will be clarified by reading a configuration for implementing the disclosure (hereinafter, referred to as an "embodiment") to be described below with reference to the accompanying drawings.

DESCRIPTION OF EMBODIMENTS

Specific embodiments according to the present disclosure will be described below with reference to the accompanying drawings.

<In-Vehicle System Configuration>

Figure 1:
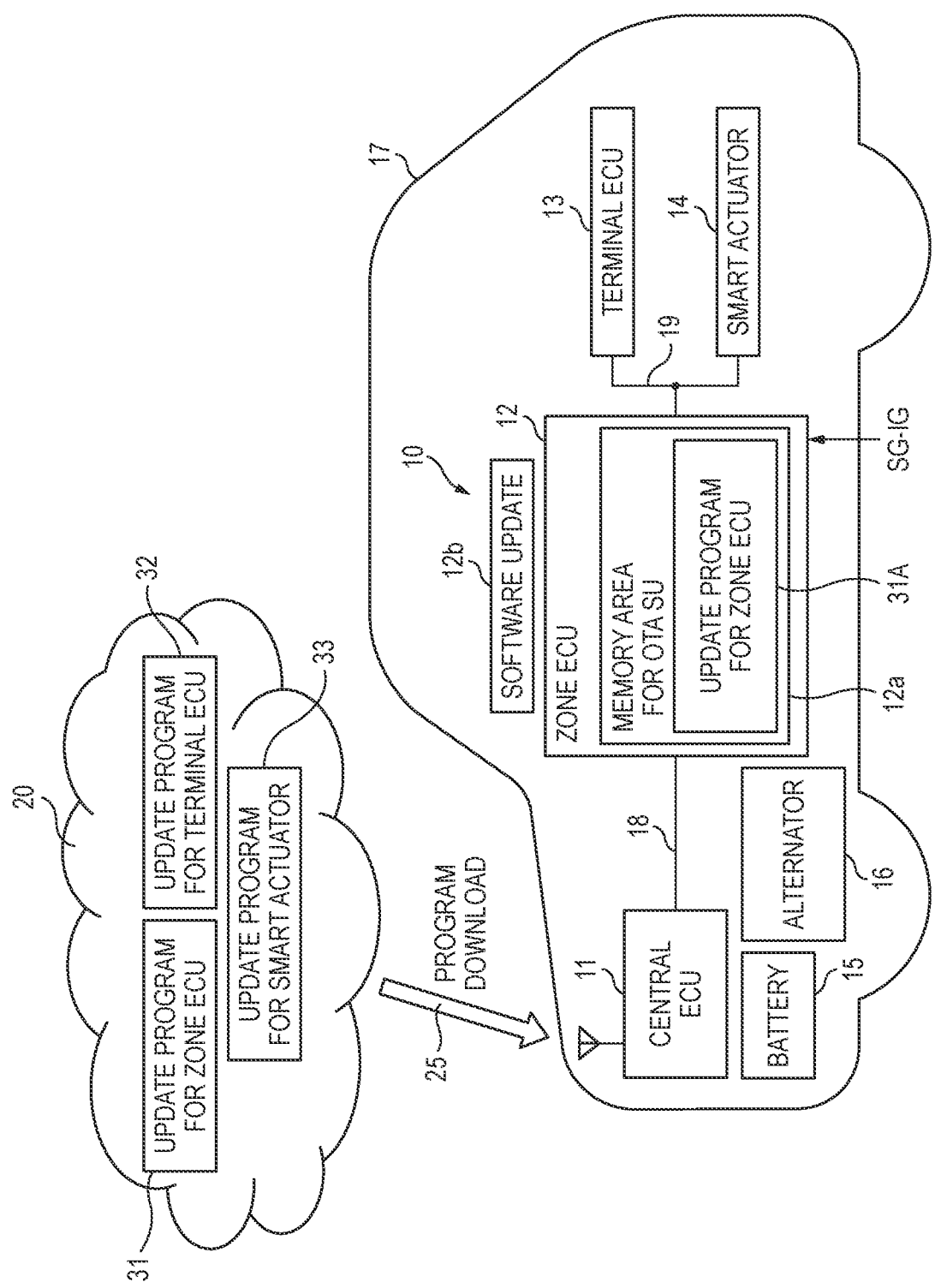
FIG. 1 is a block diagram illustrating a main unit configuration of an in-vehicle system according to an embodiment of the present disclosure.
Figure 2:
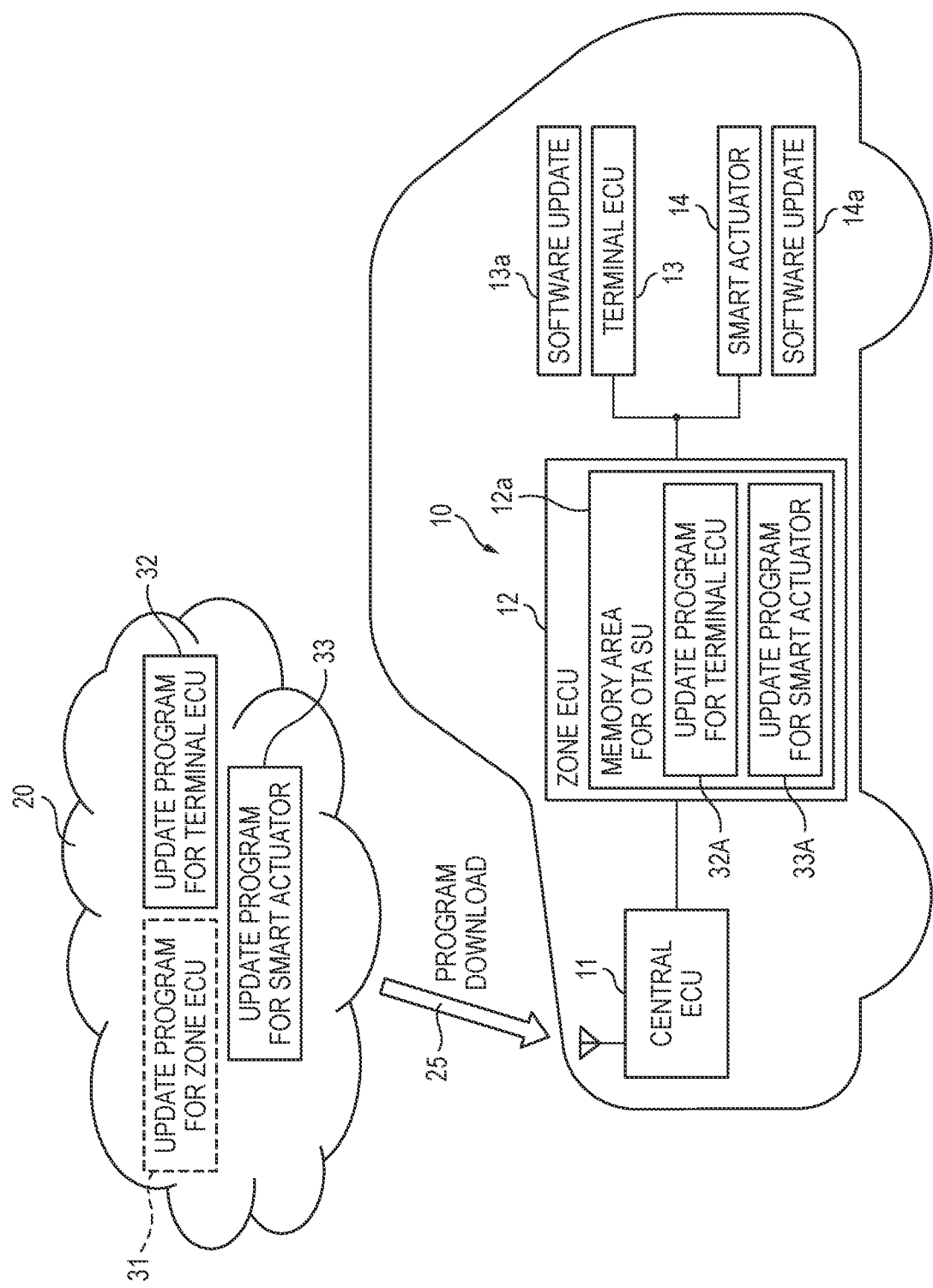
FIG. 2 is a block diagram illustrating the in-vehicle system in a state different from that of FIG. 1.

FIG. 1 is a block diagram illustrating a main unit configuration of an in-vehicle system 10 according to an embodiment of the present disclosure. FIG. 2 is a block diagram illustrating the in-vehicle system 10 in a state different from that of FIG. 1.

The in-vehicle system 10 mounted on a vehicle 17 illustrated in FIG. 1 includes a central ECU 11, a zone ECU 12, a terminal ECU 13, a smart actuator 14, and the like. The central ECU 11 is connected to the zone ECU 12 by a communication line 18. The zone ECU 12 is connected to the terminal ECU 13 and the smart actuator 14 by a communication line 19. Here, a central ECU 11 may by referred to as an uppermost control unit 11. The zone ECU 12 may by referred to as a zone control unit 12. The terminal ECU 13 and a smart actuator 14 may be referred to as lower control units 13 and 14.

In an actual vehicle, the vehicle 17 is formed with a plurality of zones, and the independent zone ECU 12 is provided for each zone. That is, the central ECU 11 is connected to a plurality of zone ECUs 12. The zones may be assigned as a plurality of regions representing differences in locations such as left and right in space of the vehicle 17, or may be assigned as a plurality of regions representing differences in functional groups.

The central ECU 11 has a function of integrating and managing the entire in-vehicle system 10 including the plurality of zones, and also has a gateway function for securely connecting the in-vehicle system 10 to a communication network such as the Internet outside the vehicle using a wireless communication function.

Therefore, the zone ECU 12 illustrated in FIG. 1 is connected to a downstream side of the central ECU 11 located at the highest level on the vehicle 17. The zone ECU 12 manages the terminal ECU 13 and the smart actuator 14 connected to a downstream side thereof.

The central ECU 11, the zone ECU 12, and the terminal ECU 13 each include a built-in microcomputer, which may be referred to as a processor 12 with respect to the zone ECU 12, capable of independent control and a communication function. The smart actuator 14 has a function of changing a function of an actuator by software, and a communication function.

Therefore, the zone ECU 12, the terminal ECU 13, and the smart actuator 14 illustrated in FIG. 1 each include software constituted by programs and data necessary for operations thereof. Each software is in a rewritable state by, for example, being arranged on a non-volatile memory. Therefore, each software can be updated as needed. In the present embodiment, these software updates (SU) can be performed by the Over The Air (OTA) using wireless communication.

The in-vehicle system 10 illustrated in FIG. 1 manages all updates of software used by the zone ECU 12 and software used by the terminal ECU 13 and the smart actuator 14. The zone ECU 12 includes an update-dedicated (OTA SU) memory area 12a, which may be referred to as one area 12a or a first area 12a. Here, the reference number 12a may be used as representing a memory. Neither the terminal ECU 13 nor the smart actuator 14 includes a memory area for update.

Therefore, in the in-vehicle system 10 illustrated in FIG. 1, the update-dedicated memory area 12a of the zone ECU 12 is used as a common storage area for processing a plurality of types of update data for different update objects. That is, both the software used by the zone ECU 12 and the software used by the terminal ECU 13 and the smart actuator 14 are updated using the common update-dedicated memory area 12a.

A storage capacity reserved in advance for the update-dedicated memory area 12a is determined to be large enough to store one type of update data having the largest data capacity among all types of update data. Therefore, for example, it is possible to store a plurality of types of update data having a relatively small capacity in the update-dedicated memory area 12a at the same time, but it is not possible to store a plurality of types of update data having a large capacity at the same time.

In the vehicle 17 illustrated in FIG. 1, a source power required for the in-vehicle system 10 to operate can be supplied from an in-vehicle battery 15 and an alternator 16 provided in the vehicle 17. However, when an engine stops, the alternator 16 stops generating electricity. Therefore, when the vehicle 17 is parked, only power stored in the in-vehicle battery 15 can be used.

When the in-vehicle battery 15 is abnormally consumed, the power supply from the in-vehicle battery 15 may be limited. Whether the alternator 16 is operating can be identified by on or off of ignition. The zone ECU 12 illustrated in FIG. 1 monitors an ignition signal SG-IG output from the vehicle 17 to identify the on and off of ignition.

The in-vehicle system 10 of the present embodiment is provided with a cloud 20 as a supply source of the update data for updating the software of each unit. The cloud 20 is arranged, for example, on a server in a predetermined data center. The cloud 20 has a function of providing the update data necessary for the software updates of the in-vehicle system 10. Here, the cloud 20 may be referred to as a software supply source.

Therefore, when the software for the zone ECU 12, the software for the terminal ECU 13, and the software for the smart actuator 14 are each ready to be updated, as illustrated in FIG. 1, update programs 31, 32, and 33 corresponding to the update objects are stored on the cloud 20. Here, the update programs 31, 32, and 33 may be referred to as an update data 31, 32, and 33. Further, the update program 31 may be referred to as a first update data 31, and the update programs 32 and 33 may be referred to as a second update data 32 and 33.

In the state of FIG. 1, the in-vehicle system 10 can download to acquire the three update programs 31, 32, and 33, respectively, by wireless data communication 25. However, only the update-dedicated memory area 12a of the in-vehicle system 10 can store the downloaded update data.

Therefore, it is necessary to appropriately process the download and update of each type of update data while checking an actual usage status of the update-dedicated memory area 12a and considering priorities. In the present embodiment, the zone ECU 12 plays a central role in the in-vehicle system 10 to control such processing.

Normally, when downloading update data having a large capacity by the wireless data communication 25, it can be predicted that each unit of the in-vehicle system 10 consumes a relatively large source power for a long time. Therefore, in the present embodiment, each update data is downloaded when the ignition of the vehicle 17 is in an on-state.

However, when actually updating the software on the in-vehicle system 10 using the downloaded update data, it is desirable to make it less susceptible to interrupts from other ECUs unrelated to the update object. When actually updating the software, it is possible to limit operations of other ECUs unrelated to the update object to reduce power consumption of the entire system. Therefore, the in-vehicle system 10 of the present embodiment executes the software update when the ignition of the vehicle 17 is in an off-state.

In the state illustrated in FIG. 1, although there are three types of update programs 31, 32, and 33 on the cloud 20, in the present embodiment, the update program 31 whose update object is the zone ECU 12 has a higher priority than the others. Therefore, the zone ECU 12 first downloads only the update program 31 by the wireless data communication 25. As a result, an update program 31A, which is a copy of the update program 31 on the cloud 20, is stored in the update-dedicated memory area 12a.

As illustrated in FIG. 1, when the update program 31A is stored in the update-dedicated memory area 12a, an update processing unit 12b of the zone ECU 12 reads the update program 31A from the update-dedicated memory area 12a, executes an update process, and updates and installs the program to the zone ECU 12.

In the in-vehicle system 10 illustrated in FIG. 1, when update installation of the update program 31A is normally completed, the update program 31A on the update-dedicated memory area 12a becomes useless. In this case, the zone ECU 12 releases the update-dedicated memory area 12a.

As a result, the update-dedicated memory area 12a becomes free, and this storage area can be used again. Therefore, the zone ECU 12 can download the update program 32 or 33 having a low priority on the cloud 20 and store the program in the update-dedicated memory area 12a. When capacities of the update programs 32 and 33 are both relatively small, both of the programs can be stored in the update-dedicated memory area 12a at the same time.

In the state illustrated in FIG. 2, after downloading by the zone ECU 12 from the cloud 20 using the wireless data communication 25, an update program 32A, which is a copy of the update program 32 on the cloud 20, is stored in the update-dedicated memory area 12a. An update program 33A, which is a copy of the update program 33, is also stored in the update-dedicated memory area 12a at the same time.

Therefore, an update processing unit 13a illustrated in FIG. 2 can update the software on the terminal ECU 13 by using the update program 32A stored in the update-dedicated memory area 12a in the zone ECU 12. An update processing unit 14a illustrated in FIG. 2 can update the software on the smart actuator 14 by using the update program 33A stored in the update-dedicated memory area 12a of the zone ECU 12.

Actually, the update processing unit 13a updates the software on the terminal ECU 13 while performing data communication between the zone ECU 12 and the terminal ECU 13 via the communication line 19. The update processing unit 14a updates the software on the smart actuator 14 while performing data communication between the zone ECU 12 and the smart actuator 14 via the communication line 19.

When the zone ECU 12 normally completes the software update using the update program 31A, the zone ECU 12 notifies the cloud 20 of completion of the software update. In this way, the cloud 20 can delete the update program 31 for the in-vehicle system 10 that is no longer needed.

<Operation of Zone ECU> <Operation in Ignition-on State>

Figure 3:
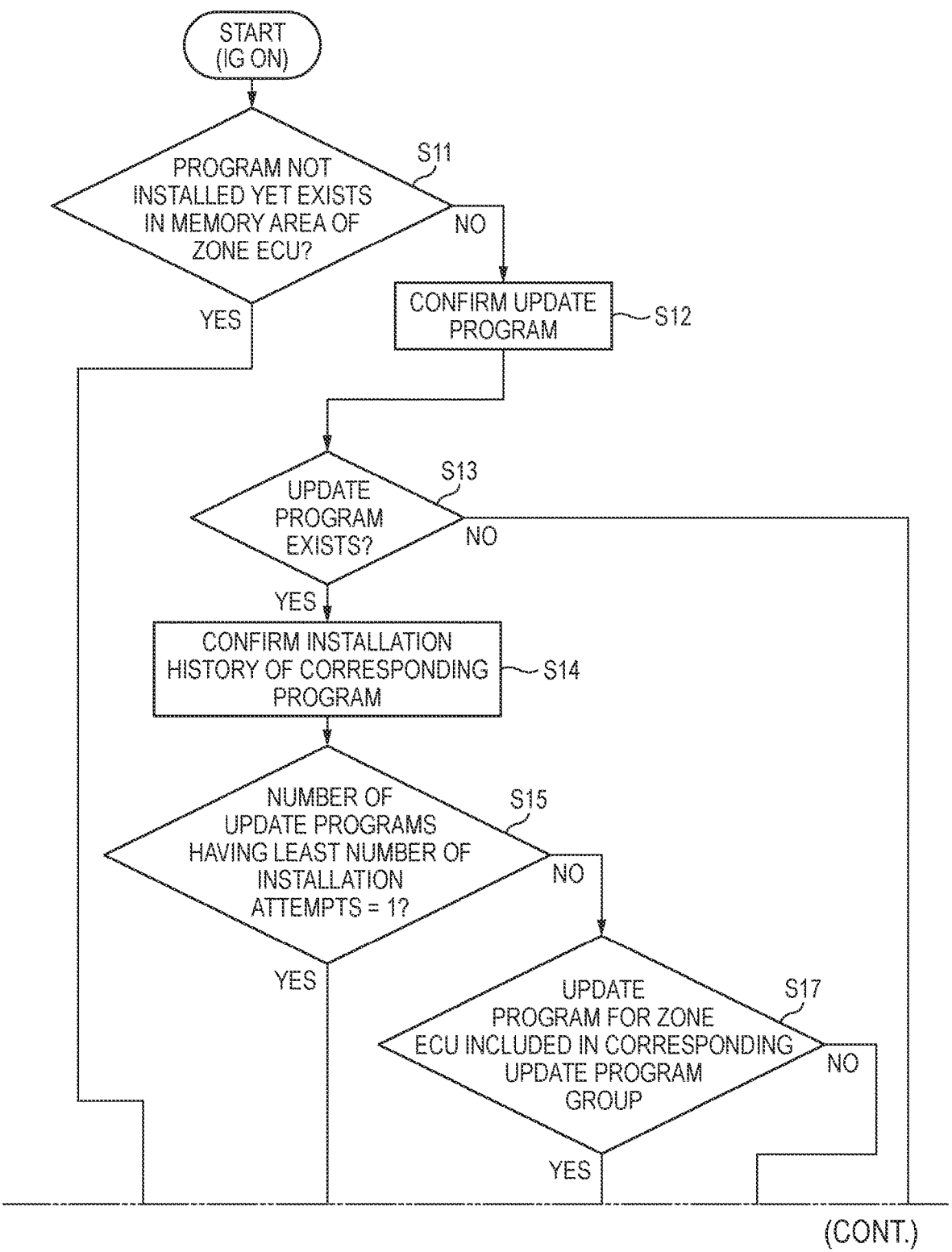
FIG. 3 is a flowchart illustrating an operation of a zone ECU in an ignition-on state.

FIG. 3 is a flowchart illustrating an operation of the zone ECU 12 in an ignition-on state. That is, when the ignition signal SG-IG input to the zone ECU 12 is in an on-state, a computer in the zone ECU 12 executes the operation illustrated in FIG. 3. The operation illustrated in FIG. 3 will be described below.

In S11, the zone ECU 12 confirms whether or not necessary software (programs and data) for which update and installation is not completed exists on the update-dedicated memory area 12a. Then, when the update-dedicated memory area 12a is free, the process proceeds to S12.

In S12, the zone ECU 12 confirms existence of a necessary update program (or data) on the cloud 20 and types of an update object and the like by performing the wireless data communication 25. If there is an update program on the cloud 20, the zone ECU 12 proceeds from S13 to S14. Then, an installation history of the corresponding update program is confirmed. This installation history is managed by the zone ECU 12 or managed by the cloud 20.

The zone ECU 12 confirms the installation history in S14 in order to enable an efficient installation progress. For example, when the update fails due to an error included in the update program, by lowering the priority of installing the update program or deferring retry of the process, it is possible to avoid continuation of an abnormal loop state in which the same process never ends. Therefore, the installation history retains data for managing the number of installation attempts for each update program as a history.

The zone ECU 12 confirms the number of update programs having the minimum number of installation attempts among the update programs existing on the cloud 20 (S15). Then, if the number of update programs having the minimum number of installation attempts is 1, the process proceeds to S16, and if there are a plurality of update programs having the minimum number of installation attempts, the process proceeds to S17.

In next S16, the zone ECU 12 downloads one corresponding update program from the cloud 20 by the wireless data communication 25 and stores the update program in the update-dedicated memory area 12a.

In next S17, the zone ECU 12 identifies whether or not an update program for updating the zone ECU 12 is included in the corresponding plurality of update programs. If there is an update program for updating the zone ECU 12 included in the corresponding plurality of update programs, the process proceeds to S18, and if not, the process proceeds to S19.

The zone ECU 12 downloads one update program for updating the zone ECU 12 from the cloud 20 by the wireless data communication 25 in S18, and stores the update program in the update-dedicated memory area 12a.

In S19, the zone ECU 12 downloads one or a plurality of update programs for updating the terminal ECU 13 or the smart actuator 14 from the cloud 20 by the wireless data communication 25, and stores the update programs in the update-dedicated memory area 12a. When a capacity of each update program is relatively small, the plurality of update programs can be downloaded and stored in the update-dedicated memory area 12a at the same time, but when the capacity of each update program is large, the update programs are downloaded and stored in the update dedicated memory area 12a one by one in an appropriate order.

Here, the steps S15 to S19, as a generic name thereof, may be referred to as a download condition S15 to S19.

<Operation in Ignition-off State>

Figure 4:
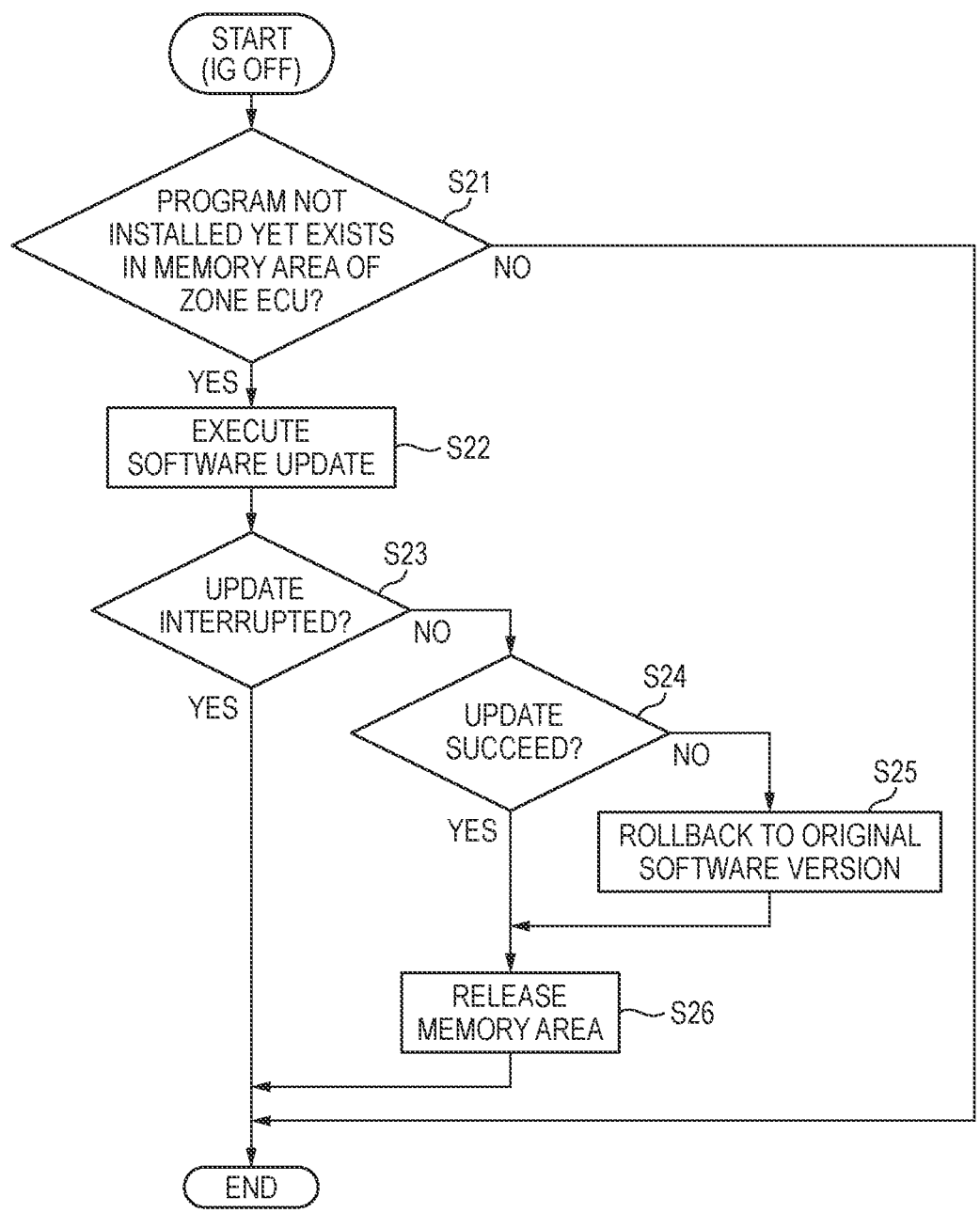
FIG. 4 is a flowchart illustrating an operation of the zone ECU in an ignition-off state.

FIG. 4 is a flowchart illustrating an operation of the zone ECU 12 in an ignition-off state.

For example, when the vehicle 17 is finished driving and parked, since the ignition is switched off to stop the engine and the alternator 16 is also stopped, a power supply source on the vehicle 17 is only the in-vehicle battery 15. The plurality of ECUs on the vehicle 17 shift to a suspension state such as sleep. In such a state, the zone ECU 12 performs the operation illustrated in FIG. 4. The operation illustrated in FIG. 4 will be described below.

In S21, the zone ECU 12 confirms whether or not necessary software (programs and data) for which update and installation is not completed exists on the update-dedicated memory area 12a. Then, when there is update data of software to be updated existing in the update-dedicated memory area 12a, the process proceeds to S22.

The zone ECU 12 uses the update data stored in the update-dedicated memory area 12a to start executing update of the software to be updated. For example, in the state illustrated in FIG. 1, since the update program 31A exists in the update-dedicated memory area 12a, the update processing unit 12b updates the software of the zone ECU 12 with the update program 31A. As illustrated in FIG. 2, when the update program 32A exists in the update-dedicated memory area 12a, by communication between the zone ECU 12 and the update processing unit 13a, the software on the terminal ECU 13 is updated by using the update program 32A on the update-dedicated memory area 12a. The same applies to processing of the update program 33A.

For example, when an output voltage of the in-vehicle battery 15 drops abnormally after the zone ECU 12 starts updating the software, it is necessary to interrupt the update to avoid further power supply voltage drop. In this case, the operation illustrated in FIG. 4 is temporarily ended. Under this case, the update data on the update-dedicated memory area 12a for which update and installation are not completed is maintained as it is.

If the software update is completed to the end without any problems, the zone ECU 12 detects a success of the corresponding update in S24, and proceeds to a next process of S26. If the software update cannot be completed correctly due to factors such as program errors in the update data, the zone ECU 12 detects a failure of the corresponding update in S24, records the failure in the history, and proceeds to next S25. In this case, the zone ECU 12 performs rollback in S25 so as to restore a state of a software version before starting the corresponding update.

When the success or the failure of the update is detected, the zone ECU 12 releases the update-dedicated memory area 12a that stores the update data for the corresponding update (S26). That is, update data that is no longer needed due to completion of update, or unnecessary update data whose update cannot be completed due to some problem, is discarded from the update-dedicated memory area 12a to secure a free area for that amount, so that the update-dedicated memory area 12a can be used for storing other update data.

As described above, according to the in-vehicle system 10 illustrated in FIG. 1 and an updating method for in-vehicle software carrying out the operations illustrated in FIGS. 3 and 4, by simply securing the update-dedicated memory area 12a that can store one type of update data, it is possible to update software of each of a plurality of loads such as the zone ECU 12, and the terminal ECU 13 and the smart actuator 14 connected to the downstream thereof. That is, by effectively utilizing one update-dedicated memory area 12a, a storage area required for software update for the entire system can be significantly reduced.

As illustrated in FIGS. 3 and 4, since the update data is downloaded and updated in conjunction with the on or off of the ignition of the vehicle 17, stable operations can be expected. That is, since it is not necessary to perform any power saving operation for a relatively long time when the ignition is in an on-state, even update data having a relatively large capacity can be efficiently downloaded from the cloud 20 or the like using wireless communication. When the ignition is in an off-state, since the ECUs other than that of a unit to be updated are almost inactive, it is less susceptible to interrupt processing by the other ECUs, and the software update processing can be executed under stable conditions.

When a plurality of types of update data exist on the cloud 20 at the same time, since the download of one update data for updating the zone ECU 12 is preferentially executed (S17, S18), it is easy for the zone ECU 12 to manage the software of the entire system in the latest state.

When a plurality of types of update data exist on the cloud 20 at the same time, since some update data having a small number of attempts is preferentially selected in consideration of the number of download attempts (S15, S16), downloading for software update of each unit of the system can be performed efficiently.

According to a first illustrative aspect of the present disclosure, an updating method for in-vehicle software for updating a software included in an in-vehicle system (10) having an uppermost control unit (11), a zone control unit (12) connected to a downstream side of the uppermost control unit (11), and a plurality of lower control units (13, 14) connected to a downstream side of the zone control unit (12), includes: securing one area (12a) in a memory (12a) on the zone control unit, the one area being capable of storing one update data (31, 32, 33) for updating the zone control unit (12) and the lower control units (13, 14) which are an update object; repeatedly checking whether the update data (31, 32, 33) exists in a predetermined software supply source (20); downloading the update data (31, 32, 33) from the software supply source (20) to store the update data (31, 32, 33) in the one area (12a), when the update data (31, 32, 33) satisfying one download condition (S15 to S19) exists in the software supply source (20); and preferentially selecting the one update data (31, 32, 33) with the highest priority from a plurality of update data (31, 32, 33) to execute the downloading, when the plurality of update data (31, 32, 33) satisfying the one download condition (S15 to S19) exist concurrently in the software supply source (20).

According to the first illustrative aspect of the present disclosure, an updating method may further include: executing the checking and the downloading of the update data (31, 32, 33) to store the update data (31, 32, 33) in the one area (12a), when an ignition signal (SG-IG) of a vehicle (17) is in an on-state; and updating the software of the update object by the update data (31, 32, 33) stored in the one area (12a), after the ignition signal (SG-IG) is switched to an off-state.

According to the first illustrative aspect of the present disclosure, the update data (31, 32, 33) may include: a first update data (31) by which the zone control unit (12) is updated as the update object; and a second update data (32, 33) by which the lower control units (13, 14) are updated as the update object. When the first update data (31) and the second update data (32, 33) exist concurrently in the software supply source (20), the selecting of the one update data (31, 32, 33) may include preferentially selecting the first update data (31).

According to the first illustrative aspect of the present disclosure, the update data (31, 32, 33) may include a plurality of update data (31, 32, 33). When the plurality update data (31, 32, 33) exist concurrently in the software supply source (20), the selecting of the one update data (31, 32, 33) may include preferentially selecting one update data (31, 32, 33) among the plurality of update data (31, 32, 33), the one update data (31, 32, 33) having the smallest number of times by which an update process is attempted.

According to the first illustrative aspect of the present disclosure, there may be provided a non-transitory computer readable medium storing a program causing a computer to execute the updating method for in-vehicle software.

According to the updating method for in-vehicle software of the above first aspect, regardless of whether the software is updated for the zone control unit or any of the plurality of lower control units, the downloaded update data is stored only in the first area. Therefore, it is not necessary to secure any storage area required for the software update other than the first area. That is, since the first area can be used in common by all update objects, there is no need to prepare a special storage area for storing update data in each of the plurality of lower control units, and a memory area of the entire system can be used efficiently. When a plurality of types of update data exist at the same time, only one type of update data with high priority is preferentially selected and downloaded. Therefore, a storage capacity of the first area can be reduced. It is possible to avoid situations such as update data of the same update object is repeatedly downloaded due to an update failure or the like.

According to a second illustrative aspect of the present disclosure, an in-vehicle system (10) includes: an uppermost control unit (11); a zone control unit (12) connected to a downstream side of the uppermost control unit (11); and a plurality of lower control units (13, 14) connected to a downstream side of the zone control unit (12). The zone control unit (12) includes: a memory (12a); and a processor (12). The memory (12a) includes one area (12a) capable of storing one update data (31, 32, 33) for updating either one software of the zone control unit (12) or the plurality of lower control units (13, 14). The processor (12) is configured to: select an update object of the update data (31, 32,33) stored in the one area (12a), and check whether the update data (31, 32, 33) exists in a predetermined software supply source (20) and to check a type of the update object. The processor (12) executes an update process to: download the update data (31, 32, 33) from the software supply source (20) to store the update data (31, 32, 33) in the one area (12a), when the update data (31, 32, 33) satisfying one download condition (S15 to S19) exists in the software supply source (20); and preferentially select the one update data (31, 32, 33) with the highest priority from a plurality of update data (31, 32, 33) to execute the downloading, when the plurality of update data (31, 32, 33) satisfying the one download condition (S15 to S19) exist concurrently in the software supply source (20).

According to the in-vehicle system of the above second aspect, regardless of whether the software is updated for the zone control unit or any of the plurality of lower control units, the downloaded update data is stored only in the first area. Therefore, it is not necessary to secure any storage area required for the software update other than the first area. That is, since the first area can be used in common by all update objects, there is no need to prepare a special storage area for storing update data in each of the plurality of lower control units, and the memory area of the entire system can be used efficiently. When a plurality of types of update data exist at the same time, only one type of update data with high priority is preferentially selected and downloaded. Therefore, the storage capacity of the first area can be reduced. It is possible to avoid situations such as update data of the same update object is repeatedly downloaded due to an update failure or the like.

According to a third illustrative aspect of the present disclosure, the processor (12) may execute the update process to: execute the checking and the downloading of the update data (31, 32, 33) to store the update data (31, 32, 33) in the one area (12a), when an ignition signal (SG-IG) of a vehicle (17) is in an on-state: and update the software of the update object by the update data (31, 32, 33) stored in the one area (12a), after the ignition signal (SG-IG) is switched to an off-state.

According to the in-vehicle system of the above third aspect, when confirming and downloading the update data, electric power output from a vehicle generator (alternator) can be used, so that it is not necessary to consider consumption of an in-vehicle battery. Therefore, a power supply can be controlled so that all necessary ECUs and communication functions can be fully used, and downloading can be performed efficiently. When executing software update, most of the plurality of ECUs are put into a suspension state, so that situations that affect the software update are unlikely to occur. Therefore, the software update can be performed efficiently.

According to a fourth illustrative aspect of the present disclosure, the update data (31, 32, 33) may include: a first update data (31) by which the zone control unit (12) is updated as the update object; and a second update data (32, 33) by which the lower control units (13, 14) are updated as the update object. When the first update data (31) and the second update data (32, 33) exist concurrently in the software supply source (20), the processor (12) may execute the update process to preferentially select the first update data (31).

According to the in-vehicle system of the above fourth aspect, when there is update data for updating the zone control unit and each of the plurality of lower control units, the zone control unit can be updated first. In this way, under control of the zone control unit updated to the latest software, subsequent software update processing can be performed in a stable state.

According to a fifth illustrative aspect of the present disclosure, the update data (31, 32, 33) may include a plurality of update data (31, 32, 33). When the plurality update data (31, 32, 33) exist concurrently in the software supply source (20), the processor (12) may execute the update process to preferentially select one update data (31, 32, 33) among the plurality of update data (31, 32, 33), the one update data (31, 32, 33) having the smallest number of times by which the update process is attempted.

According to the in-vehicle system of the above fifth aspect, it is possible to avoid occurrence of abnormal situations such as the downloading and a start of the update processing are repeated in a loop for the same type of update data. For example, it is possible to postpone a processing order for update data whose data size is large and update is likely to be interrupted due to time out, and it is possible to efficiently process update data that can be updated in a short time.

According to the updating method for in-vehicle software and the in-vehicle system of the present disclosure, a capacity of a storage area required for software updates can be reduced. That is, regardless of whether software is updated for the zone control unit or any of the plurality of lower control units, the downloaded update data is stored only in the first area. Therefore, it is not necessary to secure any storage area required for the software updates other than the first area.

What is claimed is:

1. An updating method for in-vehicle software for updating a software included in an in-vehicle system having an uppermost control unit, a zone control unit connected to a downstream side of the uppermost control unit, and a plurality of lower control units connected to a downstream side of the zone control unit, the updating method comprising:
- securing one area in a memory on the zone control unit, wherein the one area in the memory is capable of storing update data for updating the zone control unit and the lower control units which are an update object;
- repeatedly checking whether the update data exists in a predetermined software supply source and checking a type of the update object;
- downloading the update data from the predetermined software supply source to store the update data in the one area in the memory, when the update data satisfying one download condition exists in the predetermined software supply source; and
- preferentially selecting the update data with a highest priority from a plurality of update data to execute the downloading, when the plurality of update data satisfying the one download condition exist concurrently in the predetermined software supply source.

2. The updating method for in-vehicle software according to claim 1, further comprising:
- executing the repeated checking and the downloading of the update data to store the update data in the one area in the memory, when an ignition signal of a vehicle is in an on-state; and
- updating a software of the update object by the update data stored in the one area in the memory, after the ignition signal of the vehicle is switched to an off-state.

3. The updating method for in-vehicle software according to claim 1, wherein:
- the update data includes: a first update data by which the zone control unit is updated as the update object; and a second update data by which the plurality of lower control units are updated as the update object,
- when the first update data and the second update data exist concurrently in the predetermined software supply source, the preferential selecting of the update data includes preferentially selecting the first update data.

4. The updating method for in-vehicle software according to claim 1, wherein:
- the update data includes a plurality of update data,
- when the plurality of update data exist concurrently in the predetermined software supply source, the preferential selecting of the update data includes preferentially selecting one update data among the plurality of update data, the one update data among the plurality of update data having a smallest number of times by which an update process is attempted.

5. A non-transitory computer readable medium storing a program causing a computer to execute the updating method for in-vehicle software according to claim 1.

6. An in-vehicle system, comprising:
an uppermost control unit;
a zone control unit connected to a downstream side of the uppermost control unit; and
a plurality of lower control units connected to a downstream side of the zone control unit, wherein:
the zone control unit includes: a memory; and a processor,
the memory includes one area capable of storing update data for updating either a software of the zone control unit or a software of the plurality of lower control units, and
the processor is configured to:
- select an update object of the update data stored in the one area in the memory, and
- repeatedly check whether the update data exists in a predetermined software supply source and check a type of the update object, and the processor executes an update process to:
- download the update data from the predetermined software supply source to store the update data in the one area in the memory, when the update data satisfying one download condition exists in the predetermined software supply source; and
- preferentially select the update data with a highest priority from a plurality of update data to execute the downloading, when the plurality of update data satisfying the one download condition exist concurrently in the predetermined software supply source.

7. The in-vehicle system according to claim 6, wherein:
the processor executes the update process to:
- execute the repeated checking and the downloading of the update data to store the update data in the one area in the memory, when an ignition signal of a vehicle is in an on-state; and
- update a software of the update object by the update data stored in the one area in the memory, after the ignition signal of the vehicle is switched to an off-state.

8. The in-vehicle system according to claim 6, wherein:
the update data includes: a first update data by which the zone control unit is updated as the update object; and a second update data by which the plurality of lower control units are updated as the update object,
when the first update data and the second update data exist concurrently in the predetermined software supply source, the processor executes the update process to preferentially select the first update data.

9. The in-vehicle system according to claim 6, wherein:
the update data includes a plurality of update data,
when the plurality of update data exist concurrently in the predetermined software supply source, the processor executes the update process to preferentially select one update data among the plurality of update data, the one update data among the plurality of update data having a smallest number of times by which the update process is attempted.

* * * * *